United States Patent
Moesle et al.

(10) Patent No.: US 9,444,977 B2
(45) Date of Patent: Sep. 13, 2016

(54) METHOD AND DEVICE FOR ADAPTIVE NOISE MEASUREMENT OF A VIDEO SIGNAL

(75) Inventors: Frank Moesle, Stuttgart (DE); Paul Springer, Stuttgart (DE); Gregor Schewior, Hannover (DE)

(73) Assignee: Sony Corporation, Tokyo (JP)

(*) Notice: Subject to any disclaimer, the term of this patent is extended or adjusted under 35 U.S.C. 154(b) by 1093 days.

(21) Appl. No.: 13/190,807

(22) Filed: Jul. 26, 2011

(65) Prior Publication Data

US 2012/0019667 A1  Jan. 26, 2012

(30) Foreign Application Priority Data

Jul. 26, 2010  (EP) .................................... 10170745

(51) Int. Cl.
*H04N 5/21* (2006.01)
*H04N 17/00* (2006.01)
*H04N 5/14* (2006.01)

(52) U.S. Cl.
CPC .............. *H04N 5/21* (2013.01); *H04N 17/004* (2013.01); *H04N 5/145* (2013.01)

(58) Field of Classification Search
CPC ..................... G06T 5/50; G06T 5/003; G06T 2207/10144; G06T 2207/20144; G06T 2207/20201; G06T 2207/10024; H04N 5/23254; H04N 5/2327; H04N 5/23248; H04N 5/21
USPC ......... 375/240.16, 160, 240; 348/180, 222.1, 348/448; 353/122
See application file for complete search history.

(56) References Cited

U.S. PATENT DOCUMENTS 6,307,888 B1  10/2001 Le Clerc
6,359,658 B1  3/2002 He et al.
(Continued)

FOREIGN PATENT DOCUMENTS

| EP | 0 957 367 A1 | 11/1999 |
| EP | 1 681 849 A2 | 7/2006 |
| EP | 2 075 755 A2 | 7/2009 |

OTHER PUBLICATIONS

Extended European Search Report issued Nov. 23, 2011, in Patent Application No. 11175206.9.
(Continued)

*Primary Examiner* — James Pontius
(74) *Attorney, Agent, or Firm* — Oblon, McClelland, Maier & Neustadt, L.L.P (57) ABSTRACT

The present invention relates to method of adaptive noise measurement of a video signal comprising a sequence of images. The proposed method comprises the steps of searching one or more spatially uniform areas within a current image, determining a spatial uniformity value of said one or more spatially uniform areas and combining said spatial uniformity values to obtain a spatial noise value representing a first measure for the amount of noise in said current image, detecting motion by comparing the current image with one or more preceding images and/or one or more succeeding images of said sequence of images by use of a motion threshold to obtain one or more motion maps indicating the amount of motion between the current image and the respective preceding or succeeding image, searching one or more static areas within said one or more motion maps, determining a temporal uniformity value for said one or more static areas by comparing image values at positions in said one or more preceding images and/or said one or more succeeding images, at which a low amount or no motion is indicated in the respective one or more motion maps, said temporal uniformity value representing a measure for the amount of noise at said positions in said current image, and combining said obtained temporal uniformity values to obtain a combined noise value representing a second measure for the amount of noise in said current image.

23 Claims, 6 Drawing Sheets

(56) References Cited

U.S. PATENT DOCUMENTS

| | | |
|---|---|---|
| 7,369,181 B2 | 5/2008 | Kang et al. |
| 7,418,149 B2 | 8/2008 | Dinh et al. |
| 8,422,550 B2* | 4/2013 | Li .................... 375/240.01 |
| 2005/0046702 A1* | 3/2005 | Katayama et al. ........ 348/222.1 |
| 2005/0128355 A1 | 6/2005 | Kang et al. |
| 2005/0134745 A1* | 6/2005 | Bacche et al. ................ 348/702 |
| 2005/0206785 A1* | 9/2005 | Swan et al. .................... 348/448 |
| 2006/0158562 A1 | 7/2006 | Rhee |
| 2007/0035707 A1* | 2/2007 | Margulis .................... 353/122 |
| 2008/0036908 A1* | 2/2008 | Wong et al. .................. 348/448 |
| 2008/0088711 A1* | 4/2008 | Border et al. ............. 348/222.1 |
| 2008/0204600 A1 | 8/2008 | Xu et al. |
| 2008/0232458 A1 | 9/2008 | Spektor et al. |
| 2009/0167951 A1 | 7/2009 | Chiu |
| 2010/0045870 A1 | 2/2010 | Chao |
| 2011/0037899 A1 | 2/2011 | Rhee |
| 2011/0037900 A1 | 2/2011 | Rhee |

OTHER PUBLICATIONS

Qin Zhang, et al., "Automatic Assessment of Signal-To-Thermal Noise Ratio of Television Images", IEEE Transactions on Consumer Electronics, vol. 41, No. 1, XP 002663413, Feb. 1995, pp. 108-117.

Christian Hentschel, et al., "Noise Measurement in Video Images", Reprinted from Digest of Technical Papers of the International Conference on Consumer Electronics, IEEE, 2000, 3 pages.

"Peak signal-to-noise ratio", From Wikipedia, the free encyclopedia, http://en.wikipedia.org/wiki/Peak_signal-to-noise_ratio, Jul. 26, 2010, 2 pages.

Tero Koivunen, "Motion detection of an interlaced video signal", IEEE Transactions on Consumer Electronics, vol. 40, No. 3, Aug. 1994, pp. 753-760.

Dimitri Van De Ville, et al., "Deinterlacing using fuzzy-based motion detection", Third International Conference on Knowledge-Based Intelligent Information Engineering Systems, Aug. 31-Sep. 1, 1999, pp. 263-267.

Christian Hentschel, "High Quality Noise Insensitive Motion Detector Using One Field Memory", IEEE Transactions on Consumer Electronics, vol. 42, No. 3, Aug. 1996, pp. 696-704.

Chung-chi Lin, et al., "Motion Adaptive De-interlacing with Local Scene Changes Detection", Proceedings of the Second International Conference on Innovative Computing, Information and Control, Sep. 5-7, 2007, 4 pages.

Shyh-Feng Lin, et al., "Motion Adaptive Interpolation with Horizontal Motion Detection for Deinterlacing", IEEE Transactions on Consumer Electronics, vol. 49, No. 4, Nov. 2003, pp. 1256-1265.

Shyh-Feng Lin, et al., "Motion Adaptive De-Interlacing by Horizontal Motion Detection and Enhanced Ela Processing", IEEE 2003, pp. 696-699.

Yanfei Shen, et al., "Motion Adaptive Deinterlacing of Video Data with Texture Detection", IEEE Transactions on Consumer Electronics, vol. 52, No. Nov. 2006, pp. 1403-1408.

U.S. Appl. No. 13/886,807, filed May 3, 2013, Springer, et al.
U.S. Appl. No. 13/887,021, filed May 3, 2013, Springer, et al.

* cited by examiner

METHOD AND DEVICE FOR ADAPTIVE NOISE MEASUREMENT OF A VIDEO SIGNAL

FIELD OF THE INVENTION

The present invention relates to a method of adaptive noise measurement of a video signal comprising a sequence of images and to a corresponding device. Further, the present invention relates to a computer readable non-transitory medium.

BACKGROUND OF THE INVENTION

Video signals are often disturbed by noise. The most frequent type of noise is frame noise, also called analogue noise, which is furthermore just called noise in this invention. (Other noise types would be frame noise, block noise or mosquito noise, which are both not addressed here.) This noise can come from analogue or digital photography, where it may originate from short exposure times or photo sensor properties. It can also come from bad signal storage or transmission, for example if the signal was deteriorated and amplified many times.

This noise is usually uniformly distributed over the whole image. It may be correlated to some properties of the image, like brightness or contrast, but may also be uncorrelated, which is not directly relevant for this invention. It is most easily visible in static, uniform parts of an image sequence, where small deviations of color or brightness become visible. It is often desired to know the level of noise to either give feedback to the user, or to control some other image processing like sharpness enhancement or noise reduction.

Simple state of the art methods, as described, for instance, in http://en.wikipedia.org/wiki/Peak_signal-to-noise_ratio, compare a reference sequence with the same noisy sequence. By calculating the pixel-wise difference between the images, then summing up the difference and normalizing the result, a noise level can be obtained.

State of the art reference-free methods, as described, for instance, in US 2008/0232458 A1, measures noise in uniform areas of the image. Usually in the era of analogue television, a known black area outside the visible part of the image was evaluated. Since the content of the area was known to be black, the difference from the black level can be measured, summed, normalized and used as noise level. Nowadays, video sequences may not have such a known black area anymore, so that this method can not be used anymore as often and as easily as in earlier times.

US 2005/128355 A1 discloses a method of removing noise from digital moving picture data. It is proposed to reduce the number of frames used in a temporal filtering operation, which enables to detect motion between frames easily. The method comprises a method of spatial filtering, a method of temporal filtering, and a method of performing the spatial filtering and the temporal filtering sequentially. The spatial filtering method applies a spatial filtering in a YCbCr color space, preserving a contour/edge in the image in the spatial domain, and generating a weight that is adaptive to the noise for discriminating the contour/edge in the temporal filtering operation. The temporal filtering method applies temporal filtering based on motion detection and scene change detection, compensating for global motion, the motion detection considering the brightness difference and color difference of the pixels compared between frames in the temporal filtering operation, and a weight that is adaptive to the noise for detecting the motion in the temporal filtering operation. The spatial filtering method is preferably performed first, and the temporal filtering method is performed with the result of the spatial filtering.

SUMMARY OF THE INVENTION

It is an object of the present invention to provide a method and a corresponding device for adaptive noise measurement of a video signal comprising a sequence of images, which do not require the use of a noise-free reference image, are easily implementable with low efforts and provide reliable results with any kind of video signals. It is a further object of the present invention to provide a corresponding computer-readable non-transitory medium storing such a computer program.

According to an aspect of the present invention there is provided a method of adaptive noise measurement of a video signal comprising a sequence of images, said method comprising the steps of:
    searching one or more spatially uniform areas within a current image,
    determining a spatial uniformity value of said one or more spatially uniform areas and combining said spatial uniformity values to obtain a spatial noise value representing a first measure for the amount of noise in said current image,
    detecting motion by comparing the current image with one or more preceding images and/or one or more succeeding images of said sequence of images by use of a motion threshold to obtain one or more motion maps indicating the amount of motion between the current image and the respective preceding or succeeding image,
    searching one or more static areas within said one or more motion maps,
    determining a temporal uniformity value for said one or more static areas by comparing image values at positions in said one or more preceding images and/or said one or more succeeding images, at which a low amount or no motion is indicated in the respective one or more motion maps, said temporal uniformity value representing a measure for the amount of noise at said positions in said current image, and
    combining said obtained temporal uniformity values to obtain a combined noise value representing a second measure for the amount of noise in said current image.

According to a further aspect of the present invention there is provided a corresponding device for device for adaptive noise measurement of a video signal comprising a sequence of images, said device comprising:
    a uniform area search unit configured to search one or more spatially uniform areas within a current image,
    a spatial uniformity value determination unit configured to determine a spatial uniformity value of said one or more spatially uniform areas and combining said spatial uniformity values to obtain a spatial noise value representing a first measure for the amount of noise in said current image,
    a detection unit configured to detect motion by comparing the current image with one or more preceding images and/or one or more succeeding images of said sequence of images by use of a motion threshold to obtain one or more motion maps indicating the amount of motion between the current image and the respective preceding or succeeding image, a static area search unit configured to search one or more static areas within said one or more motion maps, a temporal uniformity value determination unit configured to determine a temporal uniformity value for said one or more static areas by comparing image values at positions in said one or more preceding images and/or said one or more succeeding images, at which a low amount or no motion is indicated in the respective one or more motion maps, said temporal uniformity value representing a measure for the amount of noise at said positions in said current image, and a combination unit configured to combine said obtained temporal uniformity values to obtain a combined noise value representing a second measure for the amount of noise in said current image.

According to still further aspects a computer program comprising program means for causing a computer to carry out the steps of the method according to the present invention, when said computer program is carried out on a computer, as well as a computer readable non-transitory medium having instructions stored thereon which, when carried out on a computer, cause the computer to perform the steps of the method according to the present invention are provided.

Preferred embodiments of the invention are defined in the dependent claims. It shall be understood that the claimed device, the claimed computer program and the claimed computer readable medium have similar and/or identical preferred embodiments as the claimed method and as defined in the dependent claims.

The present invention is based on the idea to provide a multi-stage processing, which may be repeated for each input image (also called frame) of the video sequence of the video signal. In particular, spatial and temporal noise measurements are suitably combined to obtain a reliable total noise measurement.

The method described in the above mentioned US 2005/128355 A1 outputs a noise-free sequence; where as much of the visible noise of the images has been removed. Further, a noise-adaptive motion detection threshold is used. In contrast, the present invention outputs a noise level only, which is measured at some suitable positions in the image, but no filtered noise-free image. The original image is left untouched, but the calculation of the noise level is the core of the present invention.

The present invention preferably derives noise-adaptive thresholds (also called motion threshold) from calculating the variance in spatial domain and explains in detail a process to find suitable measurement areas, while according to US 2005/128355 A1 the noise threshold is only a local measure used with the aim to preserve edges, which, hence, provides a much less reliable measurement result for the whole image compared to the present invention.

Further, the present invention preferably uses a noise-adaptive motion detection threshold from calculating variance or (related) standard deviation in temporal direction. In particular, an intelligent selection of suitable measurement positions is used according to the present invention, while according to US 2005/128355 A1 only a local value is used, which is just representative for the local neighbourhood, and just suitable for noise reduction, which is not a representation for the global noise.

In summary, according to the present invention, no (spatial or temporal) filtering is applied, the occurrence of edges discards the spatial measurement region (i.e. preferably, the most flat regions are searched), the occurrence of motion discards the temporal measurement region (i.e. preferably, the most static region is searched), both temporal and spatial noise measurements use selected regions and intelligently combine the results to a combined reliable noise measurement. In addition, reliability measures are preferably applied to possibly discard unreliable spatial or temporal measurement results.

In still another aspect the present invention relates to a device for adaptive noise measurement of a video signal comprising a sequence of images, said device comprising:

a uniform area search means for searching one or more spatially uniform areas within a current image, a spatial uniformity value determining means for determining a spatial uniformity value of said one or more spatially uniform areas and combining said spatial uniformity values to obtain a spatial noise value representing a first measure for the amount of noise in said current image, a detection means for detecting motion by comparing the current image with one or more preceding images and/or one or more succeeding images of said sequence of images by use of a motion threshold to obtain one or more motion maps indicating the amount of motion between the current image and the respective preceding or succeeding image, a static area search means for searching one or more static areas within said one or more motion maps, a temporal uniformity value determining means for determining a temporal uniformity value for said one or more static areas by comparing image values at positions in said one or more preceding images and/or said one or more succeeding images, at which a low amount or no motion is indicated in the respective one or more motion maps, said temporal uniformity value representing a measure for the amount of noise at said positions in said current image, and a combination means for combining said obtained temporal uniformity values to obtain a combined noise value representing a second measure for the amount of noise in said current image.

BRIEF DESCRIPTION OF THE DRAWINGS

These and other aspects of the present invention will be apparent from and explained in more detail below with reference to the embodiments described hereinafter. In the following drawings

DETAILED DESCRIPTION OF THE INVENTION

Figure 1:
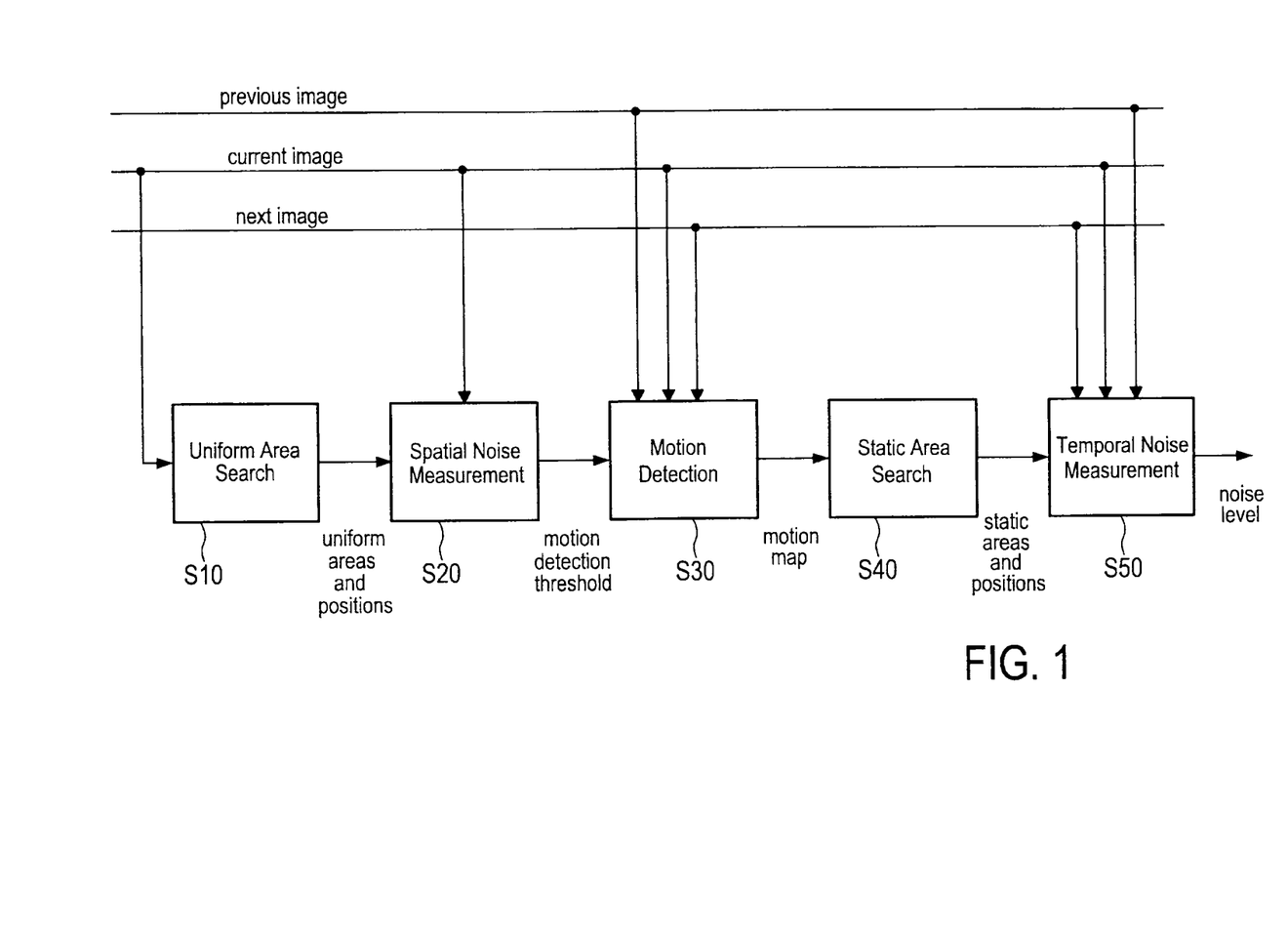
FIG. 1 shows a diagram illustrating the method according to the present invention.

According to the present invention a method employing multi-stage processing is provided, which may be repeated for selected or each input image (or frame) of a video signal comprising a sequence of images. Exemplarily, the proposed method shall be explained with reference to the diagrams shown in FIGS. 1 to 6 illustrating the steps of the proposed method. In particular, FIG. 1 illustrates an overview over the essential steps of the proposed method, and FIGS. 2 to 6 illustrated said steps separately with more detail.

Figure 2:
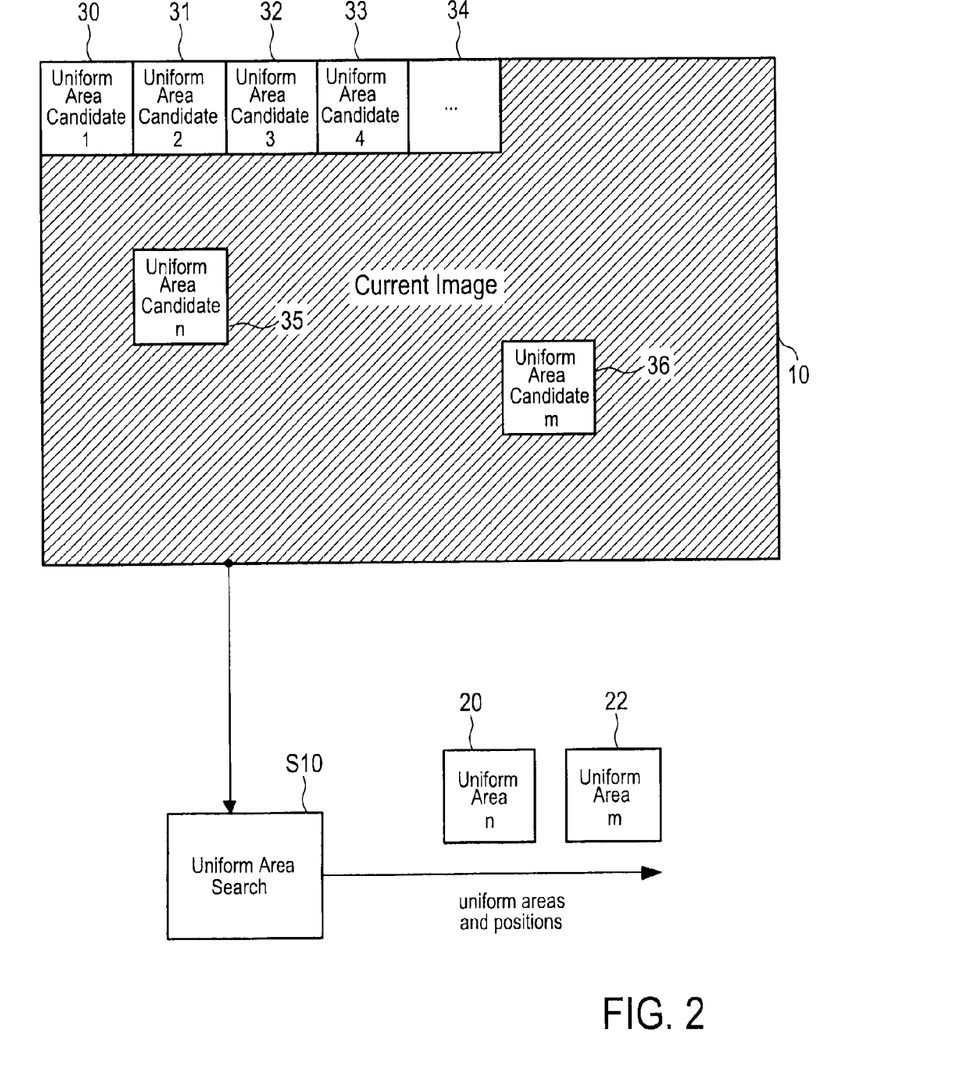
FIG. 2 shows a diagram illustrating the step of searching a uniform area of the method according to the present invention.

In a first step S10, illustrated in detail in FIG. 2, a uniform area search is performed, i.e. one or more spatially uniform areas 20, 22 within a current image 10 are searched.

One image, for instance the first image, of the video sequence is searched for (spatially) uniform areas, i.e. for the area with the least amount of detail. This is, for instance, done by repeatedly selecting different (candidate) areas (also called blocks) 30, 31, 32, 33, 34, 35, 36 of the image, then calculating a measure for the (spatial) uniformity, and comparing with the previously selected areas until the maximum uniformity is found. As a measure for (spatial) uniformity, for example the variance of the block, the standard deviation or the summed signal amplitudes after high-pass-filtering the block may be used. Low variance would mean that a block is very uniform, high variance would mean that the block is not uniform.

The candidate areas selected can be any shaped part of the image 10, with the minimum being a block containing 2 pixels, or maximally being a block containing all pixels of the image minus 1. Typically for simple calculation, a rectangular-shaped block will be chosen, e.g. 25×25 pixels in a high-definition (1920×1080) image. If the uniformity result is normalized to the size of the block, as proposed in an embodiment, it is not required that the blocks have the same size or shape, not even that they are single shape. They may also be overlapping.

Several such blocks 20, 22 may be searched in the image, and their uniformity results (as well as their positions) may be stored in a temporal memory. The search may be stopped when several such blocks are found, or when the uniformity result for the new blocks becomes too extreme (e.g. too high when using the variance criterion, but possibly also too low if another criterion is used), which means that there is no uniform area in the image left which had not been covered.

The number of necessary blocks should be higher if the image is large, also if the blocks are small. For 25×25 blocks in a high-definition image, around 10 blocks may be suitable. The stopping criteria for the block may be around 1% of the maximally possible uniformity value (e.g. 1% * 25*25*$2^8$ for 8-bit signals), just to give an example for a value that can be used as a spatial uniformity threshold.

Figure 3:
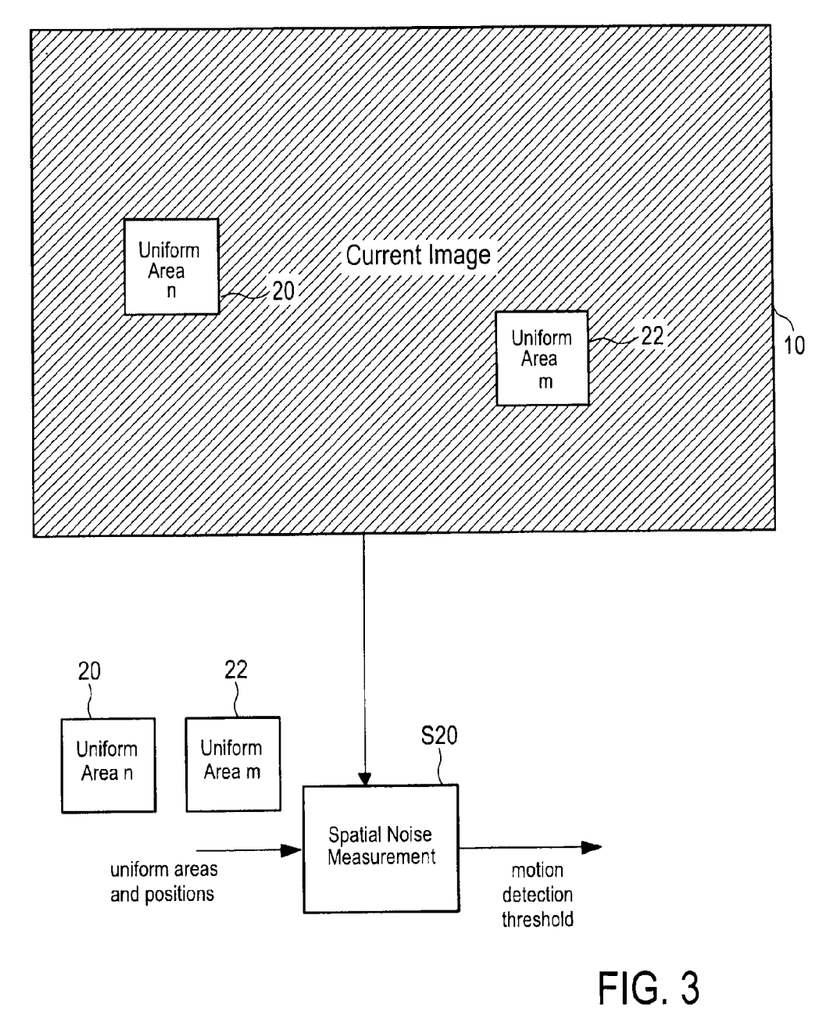
FIG. 3 shows a diagram illustrating the step of spatial noise measurement of the method according to the present invention.

In a second step S20, illustrated in detail in FIG. 3, a spatial noise measurement is performed, i.e. a spatial uniformity value of said one or more spatially uniform areas 20, 22 found in the first step S10 is determined and said spatial uniformity values are combined to obtain a spatial noise value representing a first measure for the amount of spatial noise in said current image 10.

In particular, the uniformity results (uniformity values) of the blocks 20, 22 are summed up, linearly or weighted to the size of the blocks 20, 22. Optionally, verification against a range of expected results is possible in addition. If it is known already which amount of noise may be realistic, the result may be discarded, assuming the spatial noise measurement had failed.

Figure 4A:
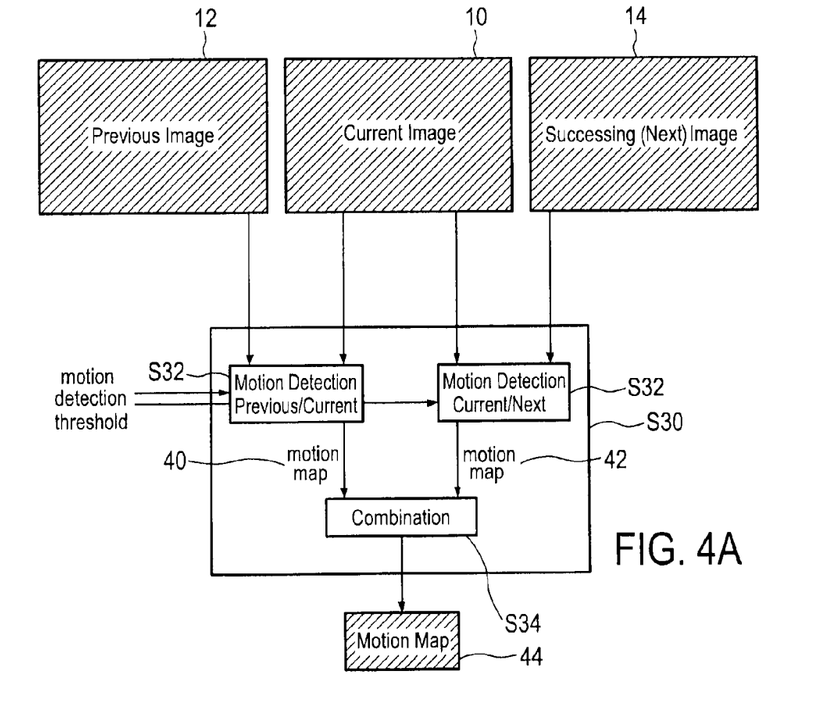
FIG. 4 shows a diagram illustrating two embodiments of the step of motion detection of the method according to the present invention.
Figure 4B:
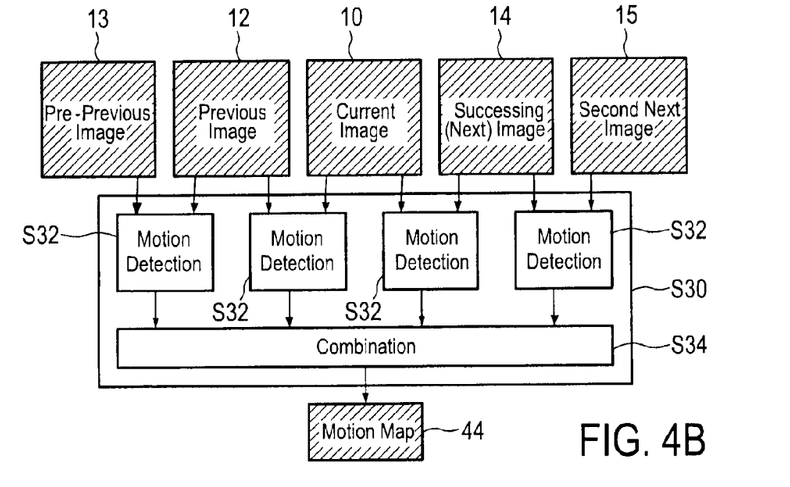

Next, in step S30, illustrated in detail in FIG. 4, motion detection is performed, i.e. motion is detected by comparing the current image 10 with one or more preceding images 12, 13 and/or one or more succeeding images 14, 15 of said sequence of images by use of a motion threshold to obtain one or more motion maps indicating the amount of motion between the current image and the respective preceding or succeeding image. Here, FIG. 4A shows a first embodiment using three images 10, 12, 14 as input, and FIG. 4B shows a second embodiment using five images 10, 12, 13, 14, 15 as input.

Motion detection is generally known and usually uses a threshold, which is often a fixed value. Motion detection shall generally provide information whether a certain local region in a sequence of consecutive images is stationary (consists of no motion) or is in motion. The output of a motion detection algorithm is typically a binary motion map, which describes the state of a certain local region (e.g. pixel level or block level). The motion map value is usually 0 for the stationary case and 1 in case of motion, but can also be differently defined. Many algorithms for motion detection are known. A simple one field memory based motion detection algorithm is described in T. Koivunen, "Motion detection of an interlaced video signal," IEEE Transactions on Consumer Electronics, vol. 40, no. 3, pp. 753-760, 1994. A simple two field (or one frame) memory based motion detection algorithm is described in Dimitri Van De Ville et al., "Deinterlacing using fuzzy-based motion detection", KES 1999, pp. 263-267 or Christian Hentschel, "HIGH QUALITY NOISE INSENSITIVE MOTION DETECTOR USING ONE FIELD MEMORY", IEEE Transactions on Consumer Electronics, Vol. 42, No. 3, August 1996. A more advanced technique for motion detection is achieved by incorporating a three field memory based approach as described in Chung-chi Lin et al. "Motion Adaptive Deinterlacing with Local Scene Changes Detection, Proceedings of the Second International Conference on Innovative Computing, Informatio and Control, p. 142, Sep. 5-7, 2007 or Shyh-Feng Lin et al., "Motion Adaptive Interpolation with Horizontal Motion Detection for Deinterlacing", IEEE Transactions on Consumer Electronics, Vol. 49, No. 4, November 2003.

In a preferred embodiment, the present invention proposes to use the uniformity result from the previous spatial noise measurement step S20 as threshold rather than a fixed threshold. If the selected blocks 20, 22 are very uniform, the noise can be assumed to be low, and the motion threshold can be set low. If the most uniform blocks 20, 22 in the image 10 are still not very uniform, the noise can be expected to be high, and the motion threshold is preferably set to a high value; otherwise noise would be mistakenly seen as motion.

The threshold can be scaled to a larger or smaller value to detect motion less or more sensitively. If the spatial noise measurement had failed as mentioned as a possibility above, a fixed (adjustable) threshold may be used instead for motion detection, which may, for instance, be around 10% of the maximum value range (e.g. 10%*$2^8$ for 8-bit signals).

Generally, for motion detection according to the present invention, any known technique may be used, like motion detection based on the detection of the pixel difference between the current image 10 and the neighboring images 12, 13, 14, 15 of the video sequence. Also hierarchical motion detection may be used. Motion detection may also be extended to more than the directly neighboring frames, e.g. to the pre-previous and the second next image as illustrated in FIG. 4B.

As shown in FIGS. 4A, 4B the step of motion detection S30 comprises sub-steps S32 for motion detection between two, preferably directly neighboring, images (there may also be other images in between two images used for motion detection).

The result of each sub-step S32 for motion detection is a motion map 40, 42 with usually the same width and height as the original image, but containing instead of pixel values an indication for the amount of motion per pixel (or block of pixels). Preferably, these motion maps 40, 42 are stored as a binary map (0=no motion (or a low amount of motion, 1=motion), but other representations are possible as well, like integer values representing the amount or probability of motion. In this context, a low amount of motion would be an amount of motion which is invisible to a typical human viewer. For example, this would be a motion which moves by a few pixels within many frames (e.g. 1 motion pixel in 10 frames).

Several motion maps 40, 42 may be calculated, e.g. one from the current image 10 to the previous image 12, and one from the current image 12 to the next image 14. The motion maps 40, 42 are then combined in sub-step S34, preferably by a pixel-wise (or block-wise) logical OR operation to a single (combined) motion map 44. With this combination, only these pixels keep the value 0=no motion, where there was no motion in any of the involved input images 10, 12, 14. The resulting (combined) motion map 44 is then preferably stored in a temporary buffer.

It should be noted that instead of a "logical OR" operation an addition could be used. In this case, however, a comparison should not be made "with value 1" (as described in the following), but "with value not 0".

Figure 5:
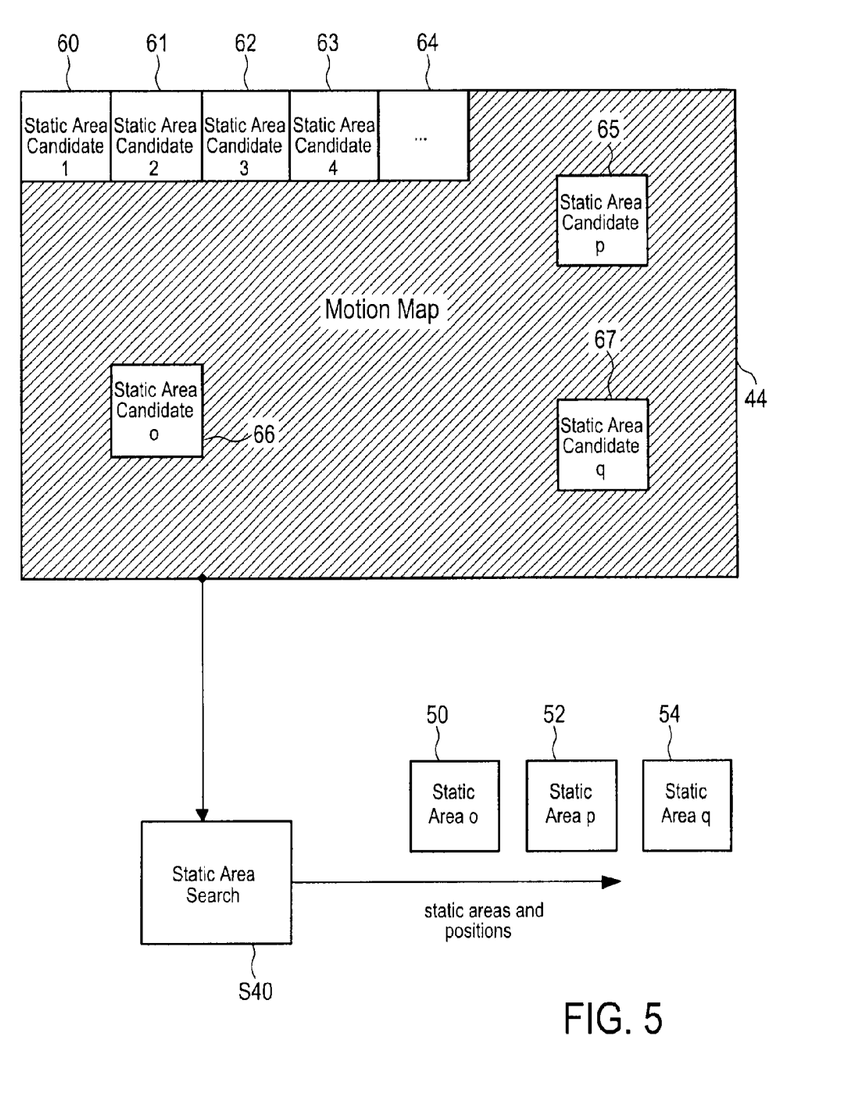
FIG. 5 shows a diagram illustrating the step of searching a static area of the method according to the present invention.

In the next step S40, as illustrated in FIG. 5, a static area search if performed, i.e. one or more static areas within said one or more motion maps, preferably in the combined motion map 44. In particular, one or several areas 50, 52, 54 in the image with the least amount of motion are searched. This is preferably done by searching an area 50, 52, 54 in the motion map 44 with the least number of moving pixels, i.e. the least amount of pixels with value 1 (=motion, provided the above proposed storage format is used for the motion map 44).

The static area search S40 is preferably done in the same way as the uniform area search S10 mentioned previously, in particular by repeatedly selecting different (candidate) areas 60, 61, 62, 63, 64, 65, 66, 67 of the motion map 44, then calculating a measure for the motionlessness, and comparing with the previously selected areas until the maximum motionlessness is found. As a measure for motionlessness, for example, the number of pixels with zero value (static, non-motion pixels) in the motion map may be used. This could be normalized to the total number of pixels in the block, especially if the blocks differ in size. Another measure for motionlessness could be the size of the largest connected block of static pixels, which means that small scattered areas are not counted. To derive one of these measures, a pre-filtering may be applied on the the motion map, e.g. a median filter to remove small spots of non-connected areas. This number or sum should be normalized to the total number of pixels in the block, especially if the blocks differ in size.

The block size and shape generally has the same restrictions and possibilities as in the uniform area search, e.g. any shape and size, but the size and shape do not need be the same as in the uniform area search. For instance, just to give an example, a rectangular shape like 25×25 is used for calculation reasons. Several static areas 50, 52, 54 should be searched and their positions being stored.

As a result, there will be a list of static areas 50, 52, 54 with the positions of motion in these static areas 50, 52, 54, and the static areas 50, 52, 54 will be the ones with the least amount of motion of the whole image 10.

Figure 6:
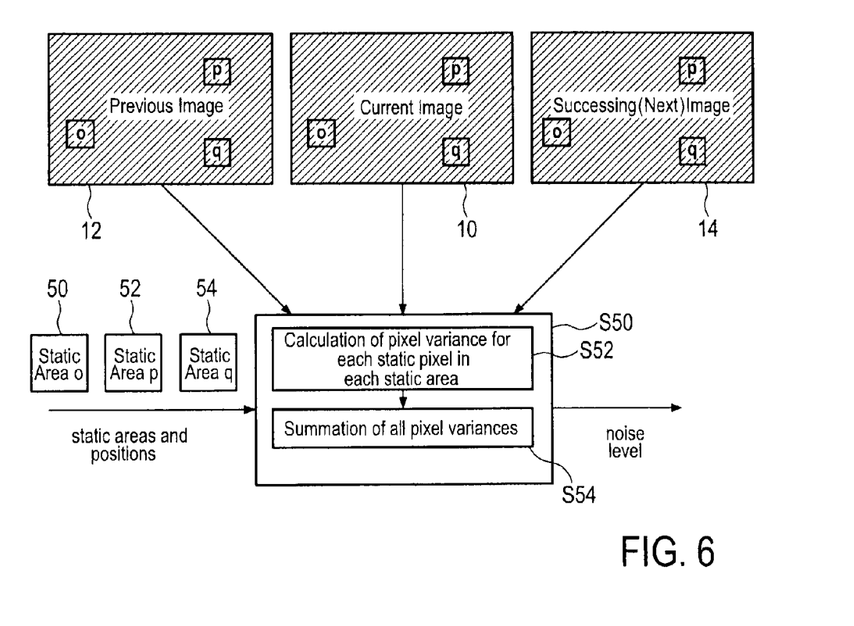
FIG. 6 shows a diagram illustrating the step of temporal noise measurement of the method according to the present invention.

Next, in step S50, as illustrated in FIG. 6, temporal noise measurement is performed, i.e. a temporal uniformity value for said one or more static areas 50, 52, 54 is determined by comparing image values at positions in said one or more preceding images 12, 13 and/or said one or more succeeding images 14, 15, at which a low amount or no motion is indicated in the respective one or more motion maps (40, 42) 44, said temporal uniformity value representing a measure for the amount of noise at said positions in said current image 10, and combining said obtained temporal uniformity values to obtain a combined noise value representing a second measure for the amount of noise in said current image.

In particular, for each of the static areas 50, 52, 54, a new temporal uniformity criterion is preferably calculated. The method is preferably as follows (sub-step S52).

The position of one pixel of a first static area 50 is selected, which is indicated in the motion map 44 as without motion (or a low amount of motion), i.e. said pixel having value 0 in the proposed storage format). For each of the input images 10, 12, 14, e.g. previous, current and next images, the values at the selected position are extracted. In this example, there are three pixel values extracted, one from previous image 12, one from current image 10, and one from next image 14. In the ideal case, these pixels would be identical, as the image is without motion at this position according to the motion map 44.

Since, however, there is noise in the image 10, these pixels slightly differ. The variation in the pixels is a measure for the amount of noise at this position. As variation criterion, usually the variance is taken, but it is also possible to use standard deviation or just the summed pixel difference can for example be used. It does not need to be the same criterion as in the uniform area search.

This process is repeated for many or all non-motion (and motion-less) pixels of the selected static area 50. The variance results for each non-motion (and motionless) pixel of the static area 50 are summed up. The motion pixels are discarded.

This is then preferably repeated for the other static areas 52, 54, so that there is one result for each static area 50, 52, 54. The result is a measure for the amount of noise in the images used; therefore, it is furthermore called noise level (or temporal uniformity value) for this static area 50, 52, 54.

The result (noise level) of a static area may be verified. For example, it may be compared against a known minimum or maximum realistic noise level, if such limitations are known. Also, the total amount of non-motion pixels per static area may be used for judgment. If the amount was below a certain threshold, e.g. 50% of all pixels within the active area, it seems that the static area was not well selected and should be discarded.

Finally, in sub-step S54, the result (noise levels for the static areas 50, 52, 54) is combined to a single noise level, e.g. by calculating the average of all areas, by calculating a weighted average based on the number of non-motion pixels, by calculating a weighted median based on the number of non-motion pixels, or other. This number of non-motion pixels may be seen as reliability measure of the process.

The final result (i.e. the combined noise level) represents a measure for the amount of noise in said current image 10. Said combined noise level may, however, be discarded completely if the number of non-motion pixels for all areas combined is still very small. In this case, the noise level obtained from the spatial noise measurement S20 may be used instead.

Figure 7:
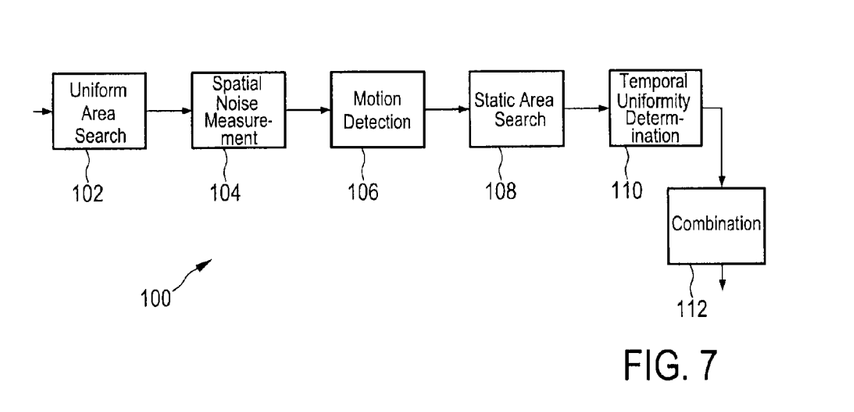
FIG. 7 shows a schematic block diagram illustrating a device according to the present invention.

An embodiment of a device 100 for adaptive noise measurement of a video signal comprising a sequence of images is schematically depicted in FIG. 7. Said device comprises:

- a uniform area search unit 102 configured to search one or more spatially uniform areas 20, 22 within a current image 10,
- a spatial uniformity value determination unit 104 configured to determine a spatial uniformity value of said one or more spatially uniform areas 20, 22 and combining said spatial uniformity values to obtain a spatial noise value representing a first measure for the amount of noise in said current image 10,
- a detection unit 106 configured to detect motion by comparing the current image 10 with one or more preceding images 12, 13 and/or one or more succeeding images 14, 15 of said sequence of images by use of a motion threshold to obtain one or more motion maps 40, 42 indicating the amount of motion between the current image and the respective preceding or succeeding image,
- a static area search unit 108 configured to search one or more static areas 50, 52, 54 within said one or more motion maps 40, 42, 44,
- a temporal uniformity value determination unit 110 configured to determine a temporal uniformity value for said one or more static areas 50, 52, 54 by comparing image values at positions in said one or more preceding images 12, 13 and/or said one or more succeeding images 14, 15, at which a low amount or no motion is indicated in the respective one or more motion maps 40, 42, 44, said temporal uniformity value representing a measure for the amount of noise at said positions in said current image, and
- a combination unit 112 configured to combine said obtained temporal uniformity values to obtain a combined noise value representing a second measure for the amount of noise in said current image 10.

The units of said device 100 may be implemented in respective hardware elements, software elements or elements comprising a mixture or hard- and software. For instance, the device 100 may be implemented as a processor or computer provided with suitable algorithms and instructions.

The device 100 may be part of another apparatus, e.g. a TV set, video processing equipment, video recorder, video player, video camera, in particular any digital video equipment where the knowledge of the noise level of the video material is of interest or importance. The obtained noise level may be used for various purposes, e.g. for judging the quality of video material, for noise cancellation or other video processing purposes.

In summary, the present invention provides a reliable noise level estimation without having a noise-free reference image. The noise measurement works still well if the spatial noise measurement fails, or if the temporal noise measurement fails. The invention thus provides an optimal result with a low amount of effort. The proposal is flexible and scalable, and can be effectively implemented as hardware or software solution.

The invention has been illustrated and described in detail in the drawings and foregoing description, but such illustration and description are to be considered illustrative or exemplary and not restrictive. The invention is not limited to the disclosed embodiments. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

A computer program may be stored/distributed on a suitable non-transitory medium, such as an optical storage medium or a solid-state medium supplied together with or as part of other hardware, but may also be distributed in other forms, such as via the Internet or other wired or wireless telecommunication systems.

Any reference signs in the claims should not be construed as limiting the scope.

The invention claimed is:

1. A method of adaptive noise measurement of an input video signal, said method comprising:
   - receiving the input video signal, the input video signal including a current image, one or more preceding images and one or more succeeding images;
   - searching for one or more spatially uniform areas within the current image;
   - determining a spatial uniformity value of said one or more spatially uniform areas and combining said spatial uniformity values to obtain a spatial noise value that represents a first measure for the amount of noise in said current image;
   - detecting motion by comparing the current image with the one or more preceding images and the one or more succeeding images by using the spatial noise value as a motion threshold;
   - obtaining one or more motion maps from said detected motion, said one or more motion maps indicating the amount of motion between the current image and the respective one or more preceding images or the one or more succeeding images;
   - searching for one or more static areas within said one or more motion maps;
   - determining, by circuitry, a temporal uniformity value for each of said one or more static areas in said one or more motion maps by comparing image values, at positions in said one or more preceding images and said one or more succeeding images, at which a low amount of motion or no motion is indicated in the respective one or more motion maps, and said temporal uniformity value representing a measure for the amount of noise at said positions in said current image; and
   - combining said determined temporal uniformity values to obtain a combined noise value representing a second measure for the amount of noise in said current image.

2. The method according to claim 1, wherein said method is repeated for each image of said input video signal.

3. The method according to claim 1, wherein said searching for one or more spatially uniform areas within said current image is performed by repeatedly selecting different areas of the current image and determining a spatial uniformity value for the selected area until one or more areas with a maximum uniformity or a uniformity below a spatial uniformity threshold are found.

4. The method according to claim 3, wherein said searching for one or more spatially uniform areas within said current image uses one of a variance of an area, a standard deviation and the summed signal amplitudes, after high-pass filtering, of an area as a measure for spatial uniformity of said area.

5. The method of claim 3, wherein said spatial uniformity value is normalized according to a size of the respective area.

6. The method according to claim 1, further comprising:
verifying said obtained spatial noise value against a range of expected spatial noise values; and
discarding said obtained spatial noise value when said obtained spatial noise value is outside said range.

7. The method according to claim 1, wherein said detecting motion uses said obtained spatial noise value or an adjustable threshold as motion threshold.

8. The method according to claim 1, further comprising combining the obtained motion maps into a combined motion map by a pixel-wise operation that sets a pixel of said combined motion map to a value that indicates a low amount of motion or no motion when the same pixel in all motion maps indicates a low amount of motion or no motion, wherein
said combined motion map is used in said determining of said temporal uniformity values.

9. The method according to claim 1, wherein said searching for one or more static areas within said one or more motion maps is performed by searching for one or more areas with a least amount of pixels having a value in said one or more motion maps indicating motion.

10. The method according to claim 1, wherein said determining a temporal uniformity value uses one of a variance, a standard deviation and a summed difference of image values at said positions, at which a low amount of motion or no motion is indicated in the respective one or more motion maps.

11. The method according to claim 1, wherein
said determining a temporal uniformity value is repeated for all positions, at which a low amount of motion or no motion is indicated in the respective one or more motion maps, and
said determined temporal uniformity values for a static area are combined, in particular summed up, to obtain a temporal uniformity value for said static area.

12. The method according to claim 1, wherein
said determining a temporal uniformity value is repeated for further static areas, and
said determined temporal uniformity values for said static areas are combined to obtain said combined noise value by determining one of an average of all temporal uniformity values, a weighted average and a weighted median of all temporal uniformity values using as weight the number of non-motion or low-motion pixels in each static area.

13. The method according to claim 1, further comprising:
verifying said determined temporal uniformity value against a range of expected temporal uniformity values; and
discarding said determined temporal uniformity value when said determined temporal uniformity value is outside said range.

14. The method according to claim 1, further comprising:
comparing a number of positions of a static area, at which a low amount of motion or no motion is indicated in the respective one or more motion maps, against a range of expected numbers; and
discarding said respective static area when said number is outside said range.

15. The method according to claim 1, further comprising:
comparing a number of positions of all static areas, at which a low amount of motion or no motion is indicated in the respective one or more motion maps, against a range of expected numbers; and
discarding said determined temporal uniformity values and using the obtained spatial noise value as measure for the amount of noise in said current image.

16. The method according to claim 1, wherein the spatial uniformity value is weighted according to a pixel area of one or more the spatially uniform areas.

17. A device for adaptive noise measurement of an input video signal, said device comprising:
circuitry configured to
receive the input video signal, the input video signal including a current image, one or more preceding images and one or more succeeding images;
search for one or more spatially uniform areas within the current image;
determine a spatial uniformity value of said one or more spatially uniform areas and to combine said spatial uniformity values to obtain a spatial noise value that represents a first measure for the amount of noise in said current image;
detect motion by comparing the current image with the one or more preceding images and the one or more succeeding images by using the spatial noise value as a motion threshold;
obtain one or more motion maps from said detected motion, said one or more motion maps indicating the amount of motion between the current image and the respective one or more preceding images or the one or more succeeding images;
search for one or more static areas within said one or more motion maps;
determine a temporal uniformity value for each of said one or more static areas in said one or more motion maps by comparing image values, at positions in said one or more preceding images and said one or more succeeding images, at which a low amount of motion or no motion is indicated in the respective one or more motion maps, and said temporal uniformity value representing a measure for the amount of noise at said positions in said current image; and
combine said determined temporal uniformity values to obtain a combined noise value representing a second measure for the amount of noise in said current image.

18. The device according to claim 17, wherein said circuitry is further configured to search one or more spatially uniform areas within said current image by repeatedly selecting different areas of the current image and determine a spatial uniformity value for said selected area until one or more areas with a maximum uniformity or a uniformity below a spatial uniformity threshold are found.

19. The device according to claim 18, wherein said circuitry is further configured to search one or more spatially uniform areas within said current image by using one of a variance of an area, a standard deviation and the summed signal amplitudes, after high-pass filtering, of an area as a measure for spatial uniformity of said area.

20. The device according to claim 18, wherein said spatial uniformity value is normalized according to a size of said respective area.

21. The device according to claim 17, where the circuitry is further configured to
verify said obtained spatial noise value against a range of expected spatial noise values; and
discard said obtained spatial noise value when said obtained spatial noise value is outside said range.

22. The device according to claim 17, wherein said circuitry is further configured to detect motion by using one of said obtained spatial noise value and an adjustable threshold as motion threshold.

23. A device for adaptive noise measurement of an input video signal, said device comprising:
receiving means for receiving the input video signal, the input video signal including a current image, one or more preceding images and one or more succeeding images;
a uniform area search means for searching for one or more spatially uniform areas within the current image;
a spatial uniformity value determining means for determining a spatial uniformity value of said one or more spatially uniform areas and combining said spatial uniformity values to obtain a spatial noise value that represents a first measure for the amount of noise in said current image;
a detection means for detecting motion by comparing the current image with the one or more preceding images and the one or more succeeding images by using the spatial noise value as a motion threshold;
motion map obtaining means for obtaining one or more motion maps from said detected motion, said one or more motion maps indicating the amount of motion between the current image and the respective one or more preceding images or the one or more succeeding succeeding images;
a static area search means for searching for one or more static areas within said one or more motion maps;
circuitry configured to determine a temporal uniformity value for each of said one or more static areas in said one or more motion maps by comparing image values, at positions in said one or more preceding images and said one or more succeeding images, at which a low amount of motion or no motion is indicated in the respective one or more motion maps, and said temporal uniformity value representing a measure for the amount of noise at said positions in said current image; and
a combination means for combining said determined temporal uniformity values to obtain a combined noise value representing a second measure for the amount of noise in said current image.

* * * * *